June 27, 1967 — R. J. PENBERTHY — 3,327,567
ROUND FILE HOLDERS AND GUIDES FOR CHAIN SAW SHARPENING
Filed Sept. 29, 1965 — 3 Sheets-Sheet 1
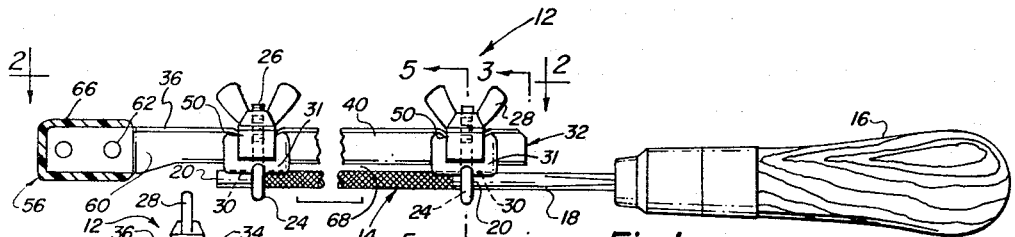
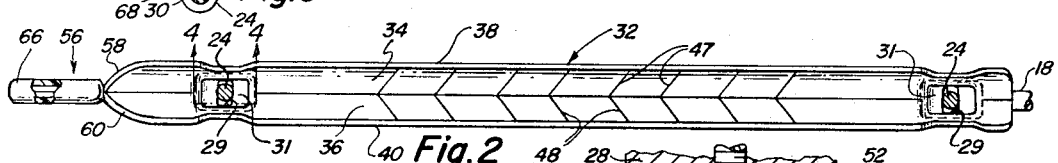
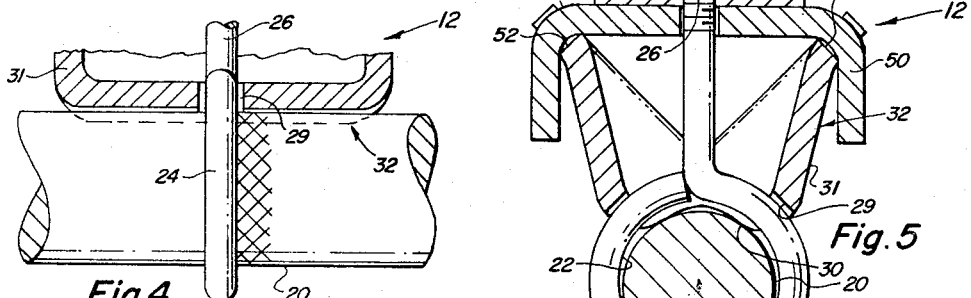
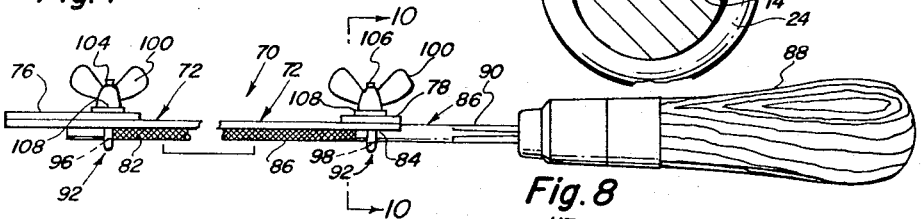
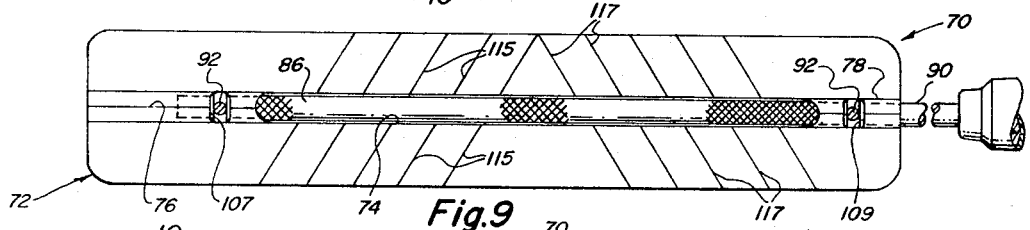
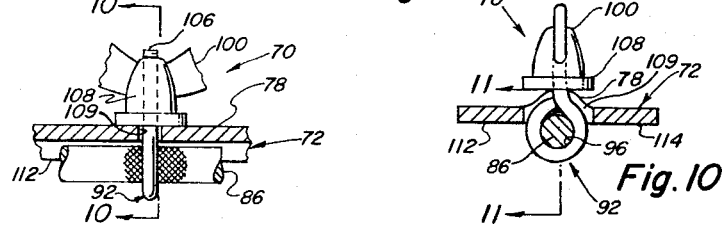
ROBERT J. PENBERTHY
INVENTOR
BY
BUCKHORN, BLORE, KLARQUIST & SPARKMAN
ATTORNEYS

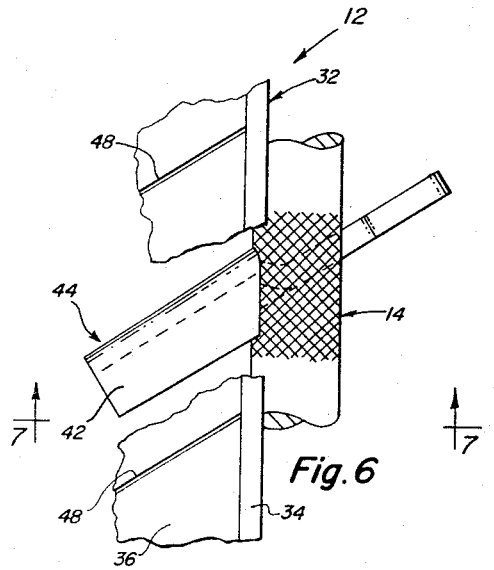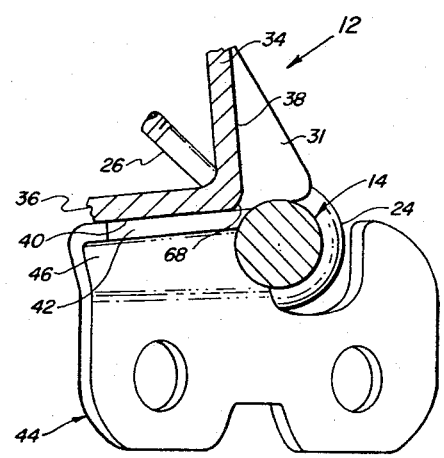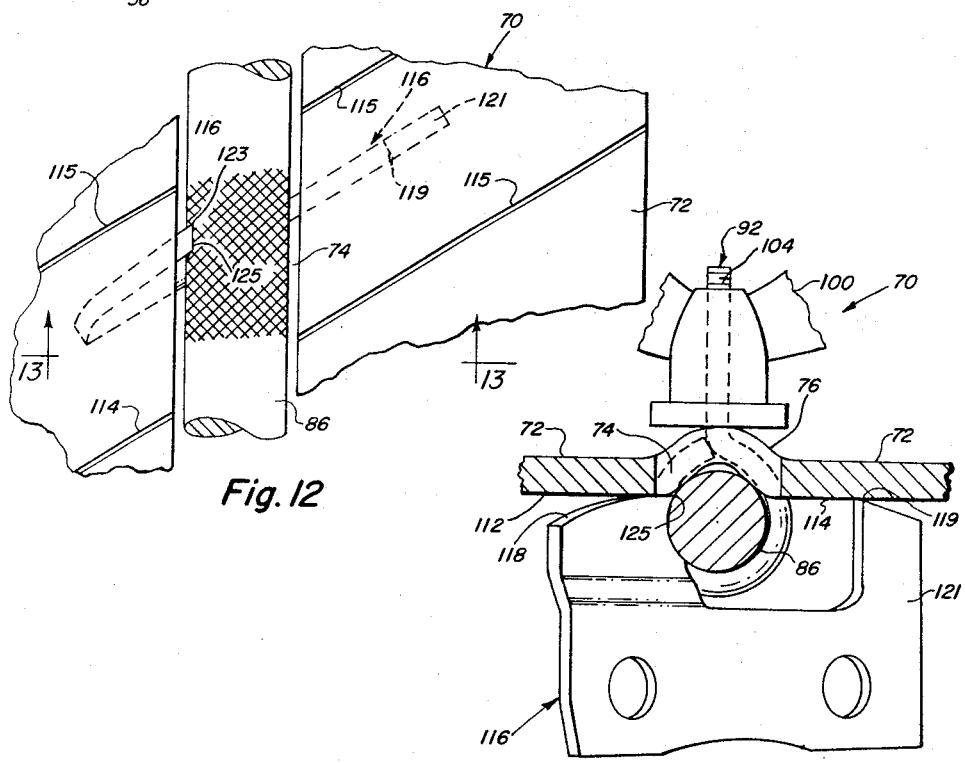

June 27, 1967  R. J. PENBERTHY  3,327,567
ROUND FILE HOLDERS AND GUIDES FOR CHAIN SAW SHARPENING
Filed Sept. 29, 1965  3 Sheets-Sheet 3

ROBERT J. PENBERTHY
INVENTOR

BY
BUCKHORN, BLORE, KLARQUIST & SPARKMAN
ATTORNEYS

United States Patent Office 3,327,567
Patented June 27, 1967

3,327,567
ROUND FILE HOLDERS AND GUIDES FOR
CHAIN SAW SHARPENING
Robert J. Penberthy, Milwaukie, Oreg., assignor to Omark Industries, Inc., Portland, Oreg., a corporation of Oregon
Filed Sept. 29, 1965, Ser. No. 491,327
17 Claims. (Cl. 76—36)

This invention relates to round file holders, and more particularly to holders for round files for filing saw chains.

An object of the invention is to provide new and improved round file holders.

Another object of the invention is to provide new and improved holders for round files for filing saw chains.

Yet another object of the invention is to provide new and improved holders for cylindrical files for filing concavely beveled cutting edges on wood cutting tools.

A further object of the invention is to provide file holders formed out of sheet metal.

Another object of the invention is to provide file holders which are simple and inexpensive and rugged in construction, while being very accurate.

The invention provides file holders for holding round files for sharpening saw chains. Each file holder preferably includes a stamped sheet metal body member having a portion intermediate the end portions thereof provided with a gauging surface extending therealong, and clamping portions formed thereon for receiving the end portions of a round file, together with a pair of clamping means adapted to press the end portions of the file securely against the clamping portions of the body member. In a file holder forming a specific embodiment of the invention there is provided a body member which is generally V-shaped in transverse cross-section throughout substantially the entire length thereof, with generally V-shaped clamping portions aligned with each other positioned at the end portions of the body member and adapted to receive the end portions of a round file. A pair of eyebolts or studs having threaded end portions extending through holes in the clamping portions of the body member are provided with transverse bores therethrough for receiving the end portions of the file and to, when wing nuts threaded on the threaded portions of the studs are tightened, press the end portions of the file tightly in the V-shaped clamping portions of the body member, thereby mounting the file holder on the file. The outer faces of the body member serve as gauging surfaces for allochiral teeth of the chipper type. In a file holder forming an alternate embodiment of the invention, there is provided a plate-like body member having a central slot extending along an elongated intermediate portion of the body member to end portions thereof, which are provided with generally V-shaped clamping portions formed in alignment with each other for receiving the end portions of a round file. Clamping eyebolts or studs having transverse bores therethrough fitting loosely on the end portions of the file also have threaded shank portions extending through holes in the V-shaped portions of the file holder, and, when wing nuts threaded onto the threaded shank portions are tightened, clamp the file securely in the file holder. The elongated slot provides clearance for the file to be drawn up into the V-shaped clamping portions. The faces of the intermediate portion of the body member are positioned at opposite sides of the file and serve as gauging surfaces for resting on the toes of cutter teeth of a saw chain of the scratcher type.

A complete understanding of the invention may be obtained from the following detailed description of file holders forming specific embodiments thereof, when read in conjunction with the appended drawings, in which:

FIG. 1 is a fragmentary side elevation view of a file holder forming one embodiment of the invention mounted on a file;

FIG. 2 is a top plan view of the file holder of FIG. 1 and taken substantially along line 2—2 of FIG. 1;

FIG. 3 is a vertical sectional view taken substantially along line 3—3 of FIG. 1;

FIG. 4 is a vertical sectional view taken substantially along line 4—4 of FIG. 2;

FIG. 5 is an enlarged vertical sectional view taken substantially along line 5—5 of FIG. 1;

FIG. 6 is an enlarged, fragmentary top plan view of the file holder of FIG. 1 and a chain saw tooth being sharpened;

FIG. 7 is a vertical sectional view taken substantially along line 7—7 of FIG. 6;

FIG. 8 is a side elevation view of a file holder forming an alternate embodiment of the invention, mounted on a file for filing a saw chain;

FIG. 9 is a top plan view of the file holder of FIG. 8;

FIG. 10 is a vertical sectional view taken substantially along line 10—10 of FIG. 8;

FIG. 11 is an enlarged vertical sectional view taken substantially along line 11—11 of FIG. 10;

FIG. 12 is an enlarged, fragmentary, top plan view of the file holder of FIG. 8 and a chain saw tooth being sharpened;

FIG. 13 is a vertical sectional view taken substantially along line 13—13 of FIG. 12;

Figure 14:
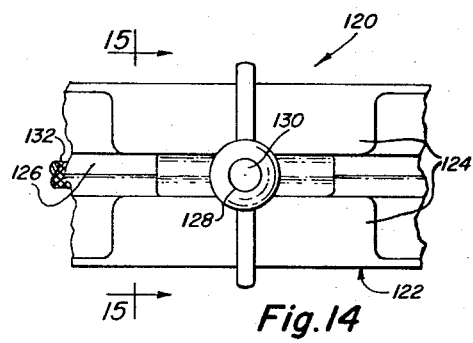
FIG. 14 is a fragmentary, top plan view of a file holder forming an alternate embodiment of the invention mounted on a file for filing a saw chain.

Referring now in detail to the drawings, a file holder 12 (FIGS. 1 to 7) is shown mounted on a round or cylindrical file 14 carried by a handle 16 secured to shank 18 thereof. End portions 20 of the file 14 extend slightly loosely through holes 22 in clamping eyebolts or studs 24 having threaded shank portions 26 on which are screwed wing nuts 28. The eyebolts 24 extend through slots 29 and press the end portions 20 of the file 14 tightly into generally V-shaped clamping portions or notches 30 formed on the bottoms of cup portions 31 drawn out of a body member 32. The clamping portions 30 are formed on the bottoms of the cup portions 31, which are drawn downwardly out of the body member 32. The body member preferably is a stamping of sheet metal. The intermediate portion of the body member between the cup portions 31 near the ends thereof is generally V-shaped in transverse cross-section, as best illustrated in FIGS. 3 and 7, and includes two elongated gauging portions 34 and 36 substantially at right angles to each other, as illustrated best in FIG. 5. The gauging portions 34 and 36 are provided with gauging surfaces 38 and 40, respectively. The gauging surface 40 is adapted to rest on the top of a toe 42 of a cutter tooth 44 on a chipper type saw chain, only the cutter tooth 44 of the saw chain being shown, and to position the file 14 precisely for filing both the cutter edge of the toe 42 and the side slitting edge of the tooth 44, which is formed on the forward portion of the shank portion 46 of the tooth 44. The gauging surface 38 is adapted to rest on a toe (not shown) of a tooth identical with the tooth 44 but allochiral relative thereto, to precisely position and guide the file 14 during sharpening of that cutter tooth. The inner, upper faces of the gauging portions are provided with inscribed guide lines 47 and 48 adapted to indicate to the user when the holder is at the desired angle relative to the saw chain and tooth 44. The body member 32 preferably is formed by stamping a flat sheet of steel to provide the clamping portions 30 and the gauging portions 34 and 36 substantially at right angles to each other and drawing the cup portions 31. The sheet of steel may be, for example, of ASI 10—10 to 10–20 cold forged steel of about .048 inch in thickness.

Channel-like washers 50 (FIGS. 1 and 5) fitting in notches 52 act as bridges for supporting the wing nuts 28. A handle portion 56 (FIGS. 1 and 2) is formed at the outer end of the body member 32 by bringing together the portions at the forward ends of the members 34 and 36 to form a thick end portion connected by bowed portions 58 and 60 to the gauging portions 34 and 36. The handle portion has locking holes 62 therein, and is dipped into polyvinylchloride to form a grip portion 66 of from about .03 to .12 inch in thickness and fill the holes 62 to lock the grip portion 66 onto the body member 32.

In the use of the file holder of FIGS. 1 to 7, the planar gauging surface 40 is placed against the flat top of the toe 42 (FIGS. 6 and 7) of the link 44, the holder is moved if necessary to bring the lines 48 parallel to the centerline of the chain, and the tooth 44 is sharpened, after which the gauging portion 38 is placed on a tooth allochiral to the tooth 44, and that link is sharpened. The clamping portions 30 and the eyebolts 24 securely clamp the file 14 to the holder and hold it rigidly. Also, the portions 31, being cupshaped and curved out of the planes of the gauging portions 34 and 36, serve to rigidify the gauging portions 34 and 36 and add to the rigidity of the body member. The generally V-shaped clamping portions 30 are spaced from apex 68 of the body member 32 and space the file from the apex and in a position parallel to the apex to precisely locate the file relative to the file holder, the clamping portions 30 being aligned longitudinally with each other.

*Embodiment of FIGS. 8 to 13*

A file holder 70 forming an alternate embodiment of the invention includes a flat, plate-like body member 72 of stamped sheet metal. The body member has a clearance slot 74 therein extending to aligned, generally V-shaped clamping portions or notches 76 and 78 positioned at the ends of the slot 74. The V-shaped portions or notches 76 and 78 are adapted to firmly clamp end portions 82 and 84 of a round or cylindrical file 86 carrying a handle 88 on a shank portion 90 thereof. Clamping eyebolts or studs 92 having transverse holes or bores 96, which receive the end portions 82 and 84 of the file loosely therein, are adapted to be drawn upwardly, as viewed in FIG. 10, by wing nut 100 screwed onto threaded end portions 104 of the eyebolts 92. The eyebolts are slidable in slots 107 and 109 (FIG. 9) in th body member. Washers 108 (FIG. 8) are positioned between the wing nuts and the curved outer apices of the portions 76 and 78. The body member has gauging surfaces 112 and 114 (FIG. 13) on opposite sides of the slot 74 and in the same plane. Parallel guide lines 115 (FIGS. 9 and 12) are provided in the upper face of the body member for indicating to a user that the file is at the correct angle relative to slitter tooth 116 when the lines 115 are parallel to the centerline of the saw chain of which the tooth 116 forms a part. Similar guide lines 117 are provided for correctly positioning the file at the correct angle to file a slitter tooth like the tooth 116 but allochiral relative thereto.

In using the file holder 70, the gauging surface 112 is placed on an outer surface 118 of the tooth 116 and the surface 114 on a tip 119 of a depth gauge 121, and the holder precisely positions and guides the file 86 to sharpen a hooked side slitting edge 123 and a kerf bottom cutting edge 125 of the tooth. The chain has other teeth allochiral to the above-mentioned tooth, and, to sharpen each of these other teeth, the gauging surfaces 112 and 114 are placed on the gauge and the toe thereof, respectively, to precisely position and guide the file to sharpen the edges thereof corresponding to the kerf bottom cutting edge 125 and the side slitting edge 123.

Figure 15:
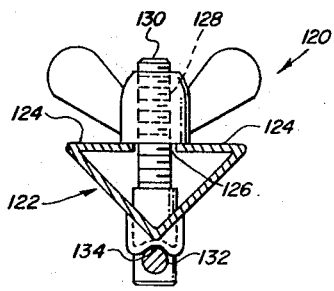
FIG. 15 is a vertical sectional view taken substantially along line 15—15 of FIG. 14.

*Embodiment of FIGS. 14 and 15*

A file holder 120 generally similar to the file holder 12 includes a body member 122, which is the same as the body member 32 except that the body member 122 has at each end portion thereof opposed top flanges 124 leaving a slot 126 therebetween. Threaded shanks 128 of clamping studs 130 extend loosely through the slots, and pull a file 132 tightly against V-shaped portions or notches 134 of the body member 122. The flanges 124 dispense with the necessity of washers like the washers 50.

Figure 16:
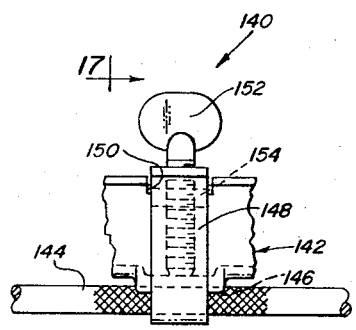
FIG. 16 is a fragmentary, side elevation view of a file holder forming an alternate embodiment of the invention, mounted on a file for filing a saw chain.
Figure 17:
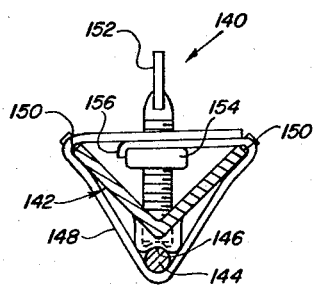
FIG. 17 is a vertical sectional view taken substantially along line 17—17 of FIG. 16.

*Embodiment of FIGS. 16 and 17*

A file holder 140 generally similar to the file holder 12 includes a body member 142 similar to the body member 32. A file 144 is clamped against V-shaped portions or notches 146 of the body member 142 by somewhat stiff clamping straps 148 encircling the body member at the end portions thereof and extending through notches 150. Thumb screws 152 extend through holes in the end portions of the straps and bear against the interior bottom portion of the body member. Each screw 152 is threaded through a square nut 154 keyed by an end tab 156 of the strap 148 and serves to tension the strap to the required extent when turned to raise the nut relative to the body member. This clamps the file tightly to the file holder.

Figure 18:
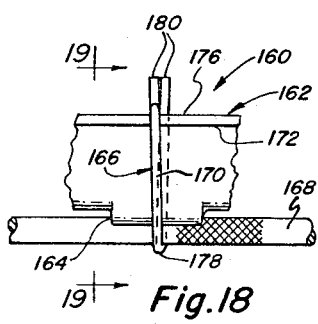
FIG. 18 is a fragmentary, side elevation view of a file holder forming an alternate embodiment of the invention, mounted on a file for filing a saw chain.
Figure 19:
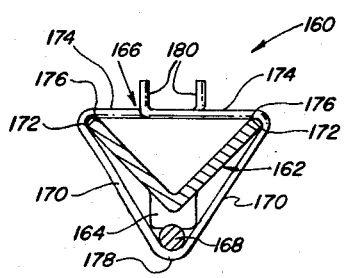
FIG. 19 is a vertical sectional view taken substantially along line 19—19 of FIG. 18.

*Embodiment of FIGS. 18 and 19*

A file holder 160 forming an alternate embodiment of the invention includes a body member 162 generally similar to the body member 32 and having V-shaped portions or notches 164 at the end portions thereof. A pair of stiff, wire, spring clips 166 pull end portions of a file 168 tightly into the V-shaped portions 164. Portions 170 of the clips are urged strongly toward corners 172 of the body member and portions 174 of the clips are urged strongly against corners 176 to cause loop portions 178 to press the file tightly into the V-shaped portions 164. Handle portions 180 are provided at the end portions of the clip.

The body members of the file holders 12, 70, 120, 140 and 160 are easily formed from inexpensive sheet metal stock and serve to excellently hold the files and guide the files during sharpening, the other elements thereof for the most part being standard, commercially available parts. The file holders hold the files with three point gripping portions to rigidly and precisely locate the files relative to the holders.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a holder for a file for a saw chain,
    an elongated body member having on the bottom thereof an elongated tooth-engaging guide surface and also being provided with a pair of aligned notch portions at the ends of the guide surface.

and a pair of releasable locking members having file-engaging portions and movably mounted on the body member for movement generally transversely of the body member to clamp end portions of a circular file in the notch portions.

2. In a file holder,
a plate-like body member of sheet metal having end portions and a gauging portion intermediate the end portions thereof,
the end portions being provided with aligned, generally V-shaped clamping portions for receiving a file therein in a position parallel to the gauging portion of the body member,
and clamping means carried by the body member for clamping a file tightly against the clamping portions of the body member.

3. In a holder for a file for a saw chain,
an elongated sheet metal member having a guide portion intermediate the end portions thereof extending longitudinally thereof for engaging a projecting portion of a saw chain link and also having a pair of notched portions offset laterally from the guide portion and in aligned position parallel to the guide portion,
and a pair of threaded means carried by the member for pressing portions of a round file into the notched portions to hold the file rigidly in a position parallel to the guide portion.

4. In a holder for a file for a saw chain,
an elongated sheet member having longitudinally aligned, open, grooved end portions and also having transverse holes adjacent the ends thereof,
a pair of locking members having threaded shanks extending slidably through the holes and having file-engaging portions adapted to press the end portions of a round file into the grooved portions,
and a pair of nuts screwed onto the threaded portions of the locking members for pulling the file tightly into the grooved portions.

5. In a file holder,
an elongated body member having an intermediate gauging portion V-shaped in transverse cross-section,
the portions of the body member at opposite sides of the gauging portion being provided with aligned, generally V-shaped grooves facing away from the apex of the V-shaped gauging portion,
and means for clamping portions of a round file in the grooves.

6. In a file holder,
an elongated body member having an intermediate gauging portion V-shaped in transverse cross-section,
the portions of the body member at opposite ends of the gauging portion being provided with aligned, generally V-shaped clamping portions facing away from the apex of the V-shaped gauging portion,
and means for clamping portions of a round file in the clamping portions.

7. In a file holder,
an elongated sheet metal member having an intermediate portion which is generally V-shaped in transverse cross-section and also having cupped end portions provided with longitudinally aligned notched portions centered relative to the apex of the intermediate portion and facing away from the apex of the intermediate portion,
the sheet metal member having holes adjacent the notched portions,
a pair of clamping members slidable through the holes and having laterally extending portions adapted to engage the file and press it into the notched portions and also having threaded end portions,
and means on the threaded end portions for pulling the clamping members through the holes to clamp the file in the notched portions.

8. In a file holder,
an elongated sheet metal member having an intermediate portion which is generally V-shaped in transverse cross-section and also having end portions provided with longitudinally aligned notched portions centered relative to the apex of the intermediate portion and facing away from the apex of the intermediate portion,
the sheet metal member having holes adjacent the notched portions,
a pair of clamping studs slidable through the holes and having laterally extending holes therein adapted to engage the file and press it into the notched portions and also having threaded end portions,
the holes in the studs being substantially larger in diameter than the file,
and a pair of nuts on the threaded end portions of the studs for pulling the studs through the holes in the body member to clamp the file in the notched portions.

9. The file holder of claim 8 in which the body member has notches adjacent the holes thereof,
and a pair of channel-like washer members on the studs and fitting into the notches to bridge the sheet metal member.

10. In a file holder,
an elongated, flat sheet having longitudinally extending, aligned, grooved portions at the end portions thereof open at one side of the sheet and also having transverse holes therethrough in the end portions thereof,
the sheet having a clearance portion extending between the grooved portions to provide clearance for a file seated in the grooved portions,
a pair of stud members slidable in the holes having first end portions projecting over and engaging the portions of the file seated in the grooved portions and having threaded second end portions at the other side of the sheet,
and nut means screwed onto the threaded second end portions to pull the stud members to positions pressing the file tightly into the grooved portions to clamp the sheet to the file.

11. In a holder for a file for a saw chain,
an elongated body member having on the bottom thereof an elongated tooth-engaging guide surface and also being provided with a pair of aligned notch portions at the ends of the guide surface,
a pair of locking members having file-engaging portions and slidably mounted on the body member for movement generally transversely of the body member to clamp end portions of a circular file in the notch portions,
and releasable means for securing the locking members to the body member in positions holding the file rigidly in the notched portions of the body member.

12. In a file holder,
a plate-like body member of sheet metal having end portions and a gauging portion intermediate the end portions thereof,
the end portions being provided with aligned clamping portions for receiving a file therein in a position parallel to the gauging portion of the body member,
and a pair of eyebolt means carried by the body member for clamping a file tightly against the clamping portions of the body member.

13. In a file holder,
an elongated body member having an intermediate gauging portion V-shaped in transverse cross-section,
the portions of the body member at opposite sides of the gauging portion being provided with aligned clamping portions facing away from the apex of the V-shaped gauging portion,
the end portions of the body member having inwardly extending flanges and holes through the apex portions thereof, eyebolt means extending between the flanges and through the holes for receiving portions of a round file, and nut means on the eyebolt means adapted to bear against the flanges and draw the eyebolt means.

14. In a file holder, an elongated body member having an intermediate gauging portion V-shaped in transverse cross-section, the portions of the body member at opposite sides of the gauging portion being provided with aligned clamping portions facing away from the apex of the V-shaped gauging portion, and a pair of clamping mechanisms each including loop means surrounding an end portion of the body member and an end portion of the file and means for tightening the loop means to pull the file against the loop portion adjacent thereto.

15. The file holder of claim 14 wherein the clamping mechanism comprises a stiff wire spring of generally triangular shape.

16. The file holder of claim 14 wherein the clamping mechanism comprises a strap, a thumbscrew extending through holes in the strap and engaging the body member, and nut means on the thumbscrew for tensioning the strap.

17. In a file holder, an elongated, flat sheet having longitudinally extending, aligned, V-shaped grooved portions at the end portions thereof open at one side of the sheet and also having transverse holes therethrough in the end portions thereof, the sheet having a clearance slot extending between the grooved portions to provide clearance for a file seated in the grooved portions, a pair of stud members slidable in the holes having first end portions projecting over and engaging the portions of the file seated in the grooved portions and having threaded second end portions at the other side of the sheet, and nut means screwed onto the threaded second end portions to pull the stud members to positions pressing the file tightly into the grooved portions to clamp the sheet to the file.

No references cited.

WILLIAM W. DYER, Jr., *Primary Examiner.*

HARRISON L. HINSON, *Examiner.*